March 28, 1967     K. L. CAPPEL     3,311,323
BALLISTIC RECOVERABLE SPACE BIO-PROBE
Filed March 31, 1965     3 Sheets-Sheet 1

INVENTOR.
KLAUS L. CAPPEL
BY
ATTORNEYS

March 28, 1967  K. L. CAPPEL  3,311,323
BALLISTIC RECOVERABLE SPACE BIO-PROBE
Filed March 31, 1965  3 Sheets-Sheet 2

INVENTOR.
KLAUS L. CAPPEL
ATTORNEYS

March 28, 1967 K. L. CAPPEL 3,311,323
BALLISTIC RECOVERABLE SPACE BIO-PROBE
Filed March 31, 1965 3 Sheets-Sheet 3

INVENTOR.
KLAUS L. CAPPEL
BY
ATTORNEYS

United States Patent Office 3,311,323
Patented Mar. 28, 1967

3,311,323
BALLISTIC RECOVERABLE SPACE BIO-PROBE
Klaus L. Cappel, Marlton, N.J., assignor, by mesne assignments, to the United States of America as represented by the Secretary of the Navy
Filed Mar. 31, 1965, Ser. No. 444,468
16 Claims. (Cl. 244—1)

This invention relates generally to space vehicles, and more particularly to a ballistic recoverable vehicle capable of providing life support for small mammals.

The small space bio-probe is one means used for studying problems associated with the nature of the space environment and questions involved in manned spaced flight. These probes, using small laboratory animals as test subjects, satisfy the need for systematically serialized observations that are required for the adequate study of some phenomena where there is a risk to human life. There are at least two problem areas that fall within this category, viz., the effects of reduced gravity for long durations and the effects of the radiations found in space. The study of the biological effects of the cosmic radiations, particularly the Van Allen belts, is an example where exposure of small animals is profitable. The variation in the intensity and the extent of these belts indicate that it may be necessary to obtain data from animals exposed in orbits at several altitudes and for varying durations, requiring a number of experiments and test vehicles. The small space bio-probe accommodating small animals provides the advantages of reduced cost at no risk to human life, while making a large amount of information available to the investigator.

It is understood that the biological probe will be fitted into the nose cone of a launching vehicle and that the probe will consist of: a life support system including a life cell for maintaining a particular environmental condition for an animal such as a rat, or the like, contained therein; instrumentation for measuring the physiological state of the animal and certain of the conditions of its environment; and further, equipment necessary for the recovery of the probe at the conclusion of the mission thereof. It is the life support system with which the present invention is most concerned and which encompasses may problems relating to structural, mechanical and thermal design.

The thermal design, in view of the necessary close control of the life support temperature—within 2° to 3° C., is one of the more difficult problems of bio-probe design. Much information already exists on the determination of temperatures in an orbiting satellite, on the prevention of burn-up during re-entry, and on methods of rejection of internally generated heat from an inhabited space vehicle. All these problems are aggravated by the closeness of thermal control required in this type of space bio-probe application.

For example, during the assembly, testing and ground holding period prior to launch, the main heat input will come from the animal, the air purifier, and possibly from environmental heating, depending on the season.

After the launching vehicle has passed through the cold layer of the atmosphere, and has been accelerated by the boosters, aerodynamic heating of the vehicle nose cone will occur. Some of this heat will be radiated and conducted to the re-entry cone, and may reach the life support area, depending upon how soon the nose cone is jettisoned. During free fall, before re-entry, the re-entry vehicle will be subjected to solar and terrestrial radiation and will also lose heat to space by radiation.

During re-entry, high temperatures are generated in the outer surface of the re-entry heat shield and during the time of parachute descent the re-entry heat will be conducted to the inside surface of the re-entry heat shield. Some of this heat will be both radiated to the life support cell and conducted to it through mechanical connections.

After impact, the probe spends an unspecified length of time in the sea, during which time it will lose heat by conduction convection, and radiation, and may gain heat by solar radiation. The latter becomes significant if the re-entry cone is shattered or if the wall thickness thereof is significantly reduced by ablation.

The greatest heat input occurs after re-entry. This heat cannot be radiated out, and cooling by evaporation of water would not be effective at lower altitudes, where the boiling point of water would be too high.

One of the methods contemplated for closely controlling the temperature within the life cell during the many aspects and varying environmental conditions encountered during the mission was that of radiative cooling. This system or method is based on a relatively small proportion of infrared in the incoming radiation, which comes from earth shine; and on the presence of a practically perfect heat sink in space at absolute zero temperature. During launching, neither of these conditions is present since the probe is covered by the nose cone of the vehicle, the inner surface of which, in spite of insulation, becomes fairly warm due to aerodynamic heating. Therefore, during this stage, the life cell would be unable to reject all the heat generated by the animal and by the air purifier.

It was then suggested that the excess heat be rejected after the nose cone had been jettisoned. Since the probe was enclosed in a re-entry cone which in turn was necessitated by the desire to recover the life cell, the main structural members were arranged and proportioned to conduct the internally generated heat to a rejection shield, and an attempt was made to locate the shield at the after end of the re-entry cone, which must be jettisoned prior to release of the recovery parachute. Three objections were found to this arrangement: first, it was structurally and mechanically complex; second, because of the slip fit required for removal, heat transfer across the joint, which depends on the contact pressure would not be sufficient; and finally, the proportioning of the heat rejecting surfaces for the relatively delicate thermal equilibrium would not have permitted quick enough removal of heat absorbed from the nose cone and the re-entry cone. This condition would be aggravated by the thermal inertia of the probe, which contains all the re-entry equipment in addition to the life support system.

Instead of the radiative cooling for the recoverable probe, transportation cooling was considered for purposes of maintaining close control of the life cell temperature. In this method, water from a pressurized reservoir is admitted by a control valve to a porous metal plate mounted in intimate contact with the structure to be cooled. The water diffuses through this plug and vaporizes in the vacuum of space, where the boiling point is low; a considerable amount of energy is removed by this phase change. However, it was determined that heat rejection by evaporation of water was considered to require more complex equipment and controls than could be justified by the short duration of the experiment and that a large amount of water would be required at an expenditure of weight and volume that could not be tolerated.

An object of the present invention is to provide a lightweight ballistic vehicle capable of providing life support for small mammals for periods of time which are long enough to permit evaluation of the effect of weightlessness on learned behavior.

Another object is to provide a ballistic recoverable space biological probe capable of providing life support for small mammals for periods of time which are long enough to permit evaluation of the effect of weightlessness on learned behavior.

A further object of the invention is the provision of a recoverable bio-probe capable of at least limited flight under zero-g conditions and capable of providing life support for small mammals.

Still another object is to provide a ballistic recoverable space biological probe capable of providing life support for small mammals for periods of time which are long enough to permit evaluation of the effect of weightlessness on learned behavior and which permits the biological payload or animal to survive under the acceleration and heat stresses of re-entry.

Yet another object of the present invention is the provision of a recoverable bio-probe capable of supporting the vital functions of a rat for a period of time during space flight and for measuring the physiological state of the animal and certain of the conditions of its environment.

A still further object is to provide a ballistic recoverable space probe which provides an animal with an environment which insures its viability and also its ability to perform the tasks essential for a planned experiment during space flight.

Various other objects and advantages will appear from the following description of an embodiment of the invention and the novel features will be particularly pointed out hereinafter in connection with the appended claims.

Figure 1:
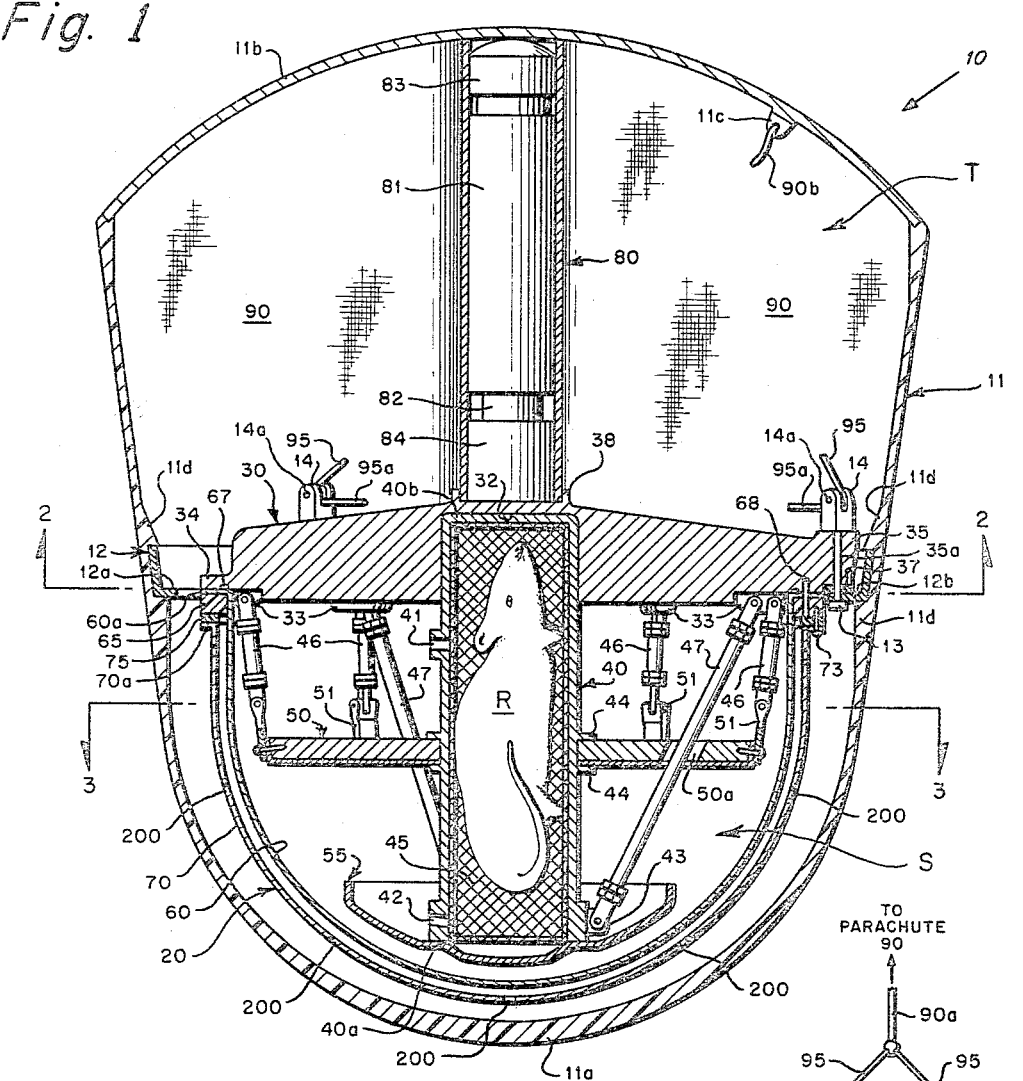
FIG. 1 is a partial vertical cross section of the novel biological space probe with various portions removed for purposes of illustrative simplicity.

In the illustrated embodiment of the invention and with particular reference to FIG. 1, the recoverable ballistic space biological probe is illustrated generally at 10 and is adapted and proportioned to fit within the nose cone of a launching vehicle, not shown. The biological probe 10 includes an ablative reentry cone 11 which has a thickened wall portion at the forward end 11a thereof and a removable cap 11b at the after end thereof having a mechanical interlock wtih the remaining body portion of cone 11. The cap in turn has a lug 11c secured to the interior surface thereof for purposes to be described below.

The shape of the recovery capsule or re-entry cone 11 is determined by the requirement of aerodynamic stability and by the need for preventing burn-up during re-entry. The maximum diameter at the after end is determined by the inside diameter of the vehicle nose cone, not shown, which in turn determines the minimum length of the recovery capsule. In order to achieve aerodynamic stability, the center of gravity is positioned well forward of the center of pressure. This is accomplished by locating the life cell, generally indicated at 20, and associated equipment in the nose of the recovery vehicle 11. Therefore, the compressed life support system or life cell 20 occupies approximately one-third lengthwise of the recovery vehicle 11 thereby leaving the upper two-thirds of the recovery capsule void except for essential recovery equipment to be more fully described below.

The recovery capsule or re-entry cone 11 is formed of a material known and used in the art for this purpose and, for example, may be of the linen-phenolic type.

A flanged ring 12 is molded or otherwise formed within the lower section of the re-entry cone 11 and a reinforcing shoulder 11d is additionally provided to support the horizontal leg 12a of the angle from which the mounting ring is formed thus providing adequate support against high-g entry loads. The horizontal leg 12a of flange ring 12 is provided with three outwardly extending mounting portions or lugs 12b, only one of which is shown in FIG. 1, which are positioned at 120° intervals about the periphery of the flange ring 12 for mounting the life cell 20 to the re-entry cone 11. Apertures 12c are further formed in the mounting lugs 12b for receiving bolts 13 therethrough for the purpose of fastening the life cell 20 to the re-entry cone 11. An internally threaded clevis nut 14 including a clevis pin 14a completes the fastening assembly and will be more fully described below, the clevis nut additionally serving as the parachute attachment connecting point for suspending the probe 10 during descent.

Figure 2:
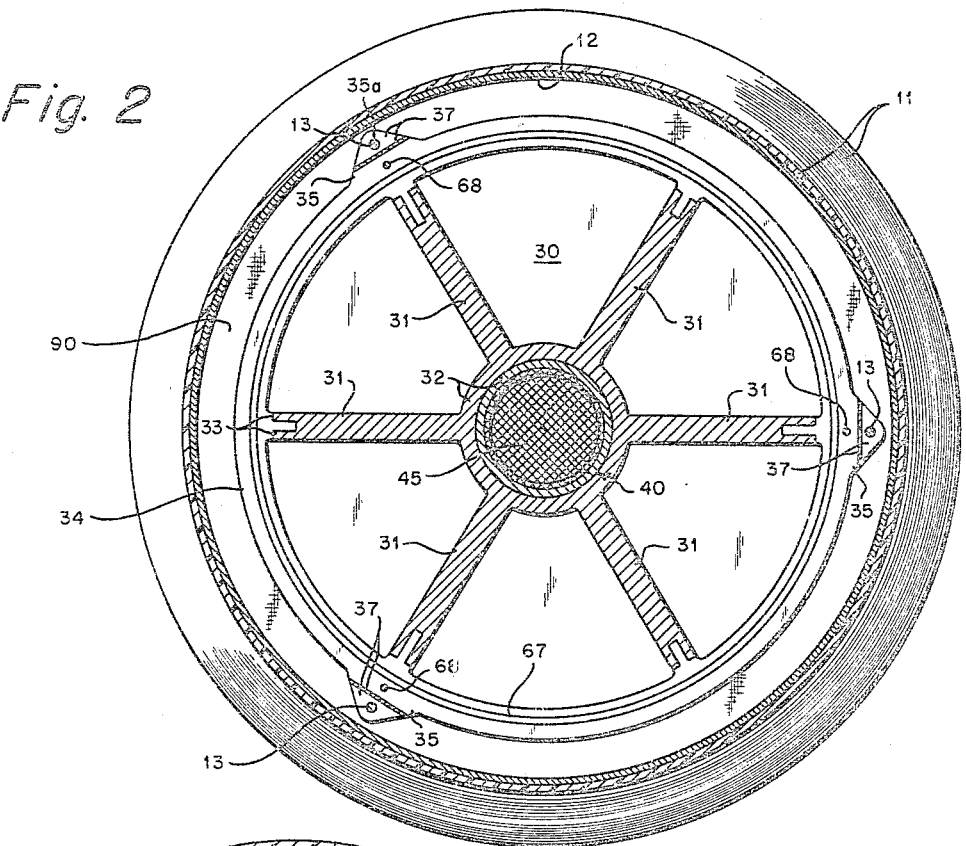
FIG. 2 is a view taken along the line 2—2 of FIG. 1.
Figure 3:
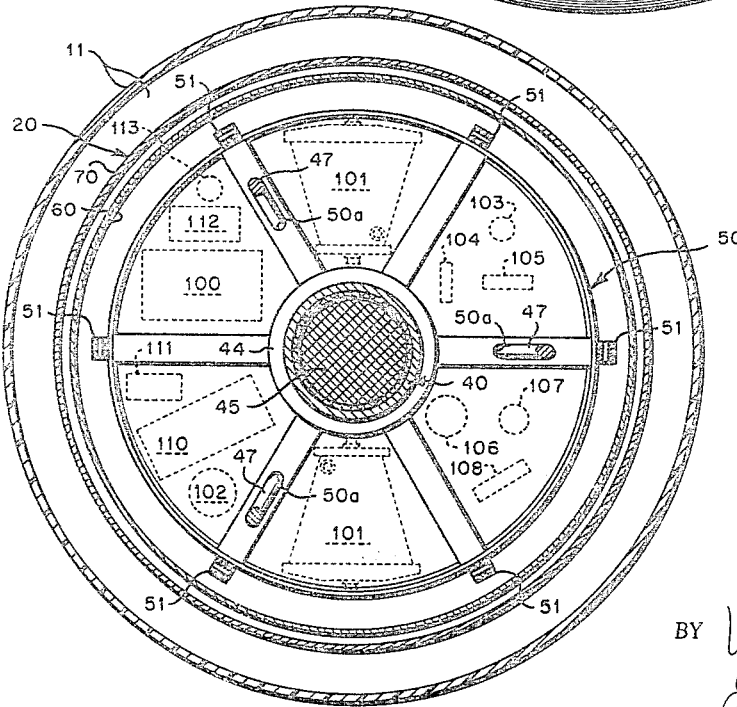
FIG. 3 is a view taken along the line 3—3 of FIG. 1.

Referring now to FIGS. 1, 2 and 3, the life cell or life supporting structure 20 is illustrated as including a top cover or head 30 which serves as the main structural member of the life cell structure and may be constructed, for example, by machining a single aluminum forging of predetermined and desired thickness. In order to increase the bending strength thereof, the top cover 30 is constructed of dished-shaped configuration and includes six integral strengthening web plates 31 spaced at 60° intervals on the concave side of the cover 30 and which terminate at a cylindrical depending socket 32 fixed to the concave side of the cover 30. Each of the six web plates 31 are formed intermediate the ends thereof with integrally formed clevis members 33, the purpose of which will be made clearer below.

The top cover or head 30 terminates and is formed along the outer periphery thereof with a mating flange 34 which in turn includes three short cantilever arms 35 projecting radially therefrom at intervals of 120° about the periphery of the top cover 30. Apertures 35a extending through arms 35 provide the three mounting points by which the top cover 30 is supported and attached to the three mounting lugs 12b formed in the flange ring 12 by bolt 13 and clevis nut 14. It should be noted that the diameter of the mounting flange 34 is less than the diameter of the horizontal leg 12a of the flange ring 12 and therefore these elements make contact only at the three aforesaid mounting points. In order to minimize heat transfer from the re-entry cone 11 to the life cell 20 through flange ring 12, units 37 of heat insulating material are interposed between the three mounting lugs 12b on the flange ring 12 and the three arms 35 on the cover 30.

A tubular rat chamber 40 having an open end 40a and a closed end 40b is positioned with the closed end 40b socketed within the depending socket portion 32 constructed in top cover 30. An inlet port 41 is formed in the wall of chamber 40 adjacent the closed end 40b and an outlet port 42 is formed in the chamber 40 adjacent the open end 40a. The exterior of the chamber 40 includes three radially extending, integrally formed and equally spaced clevis lugs 43, only one of which is illustrated, and a longitudinally spaced pair of radially extending annular flanges 44 positioned intermediate the length of chamber 40.

A cylindrical wire mesh screen unit 45 conforming to the interior surface of the chamber 40 and providing a primary enclosure for a rat R is positioned within chamber 40 with the head of rat R positioned adjacent the closed end 40b and inlet port 41.

A main shelf or deck 50 for supporting the life support equipment and monitoring devices is constructed of two sections riveted or otherwise connected together and coaxially disposed about the tubular chamber 40 between the annular flanges 44 and is appropriately and rigidly fastened thereto. Deck 50 is supported at the outer extremities thereof by six short turnbuckle stays 46 of the type known and used in the art which interconnect the clevis members 33 formed in the top cover 30 and support hooks 51 rigidly secured to the main shelf at the periphery thereof.

The tubular rat chamber 40 is held in the socketed position within the top cover 30 by three long turnbuckle stays 47 connected to three of the clevis members 33 on the web plates 31 and the three clevis lugs 43 formed adjacent the open end of the tubular chamber 40. The long turnbuckle stays 47 pass through three apertures 50a in the main shelf 50.

A second shelf 55 is secured in any appropriate manner to and forms a closure for the open end 40a of the tubular chamber 40 and also serves as a support shelf for necessary life support and monitoring equipment with the object of lowering the center of gravity of the probe 10.

A pressure dome generally indicated at 60 and constructed of aluminum or the like includes an integral flange 60a which is fastened to the mating flange 34 in the top cover 30 by an annular clamping ring 65. A sealing member 67 is formed in the mating flange 34 and engages the flange 60a of the pressure dome or shell 60 when the clamping ring 65 is bolted by fasteners 68 to the top cover thereby forming a sealed inner chamber S.

In order to reduce radiative heat transfer from the re-entry cone 11 to chamber S, a second aluminum shell or heat shield 70 surrounds the exterior of the pressure shell 60, is spaced therefrom and is connected by integral flange 70a to the clamping ring 65 by appropriate fasteners 73. Insulating spacer ring 75 is interposed between the flange 70a and the clamping ring 65 to inhibit heat transfer to the inner chamber.

It should be observed at this point that the assembled life cell 20 is supported solely by the three mounting lugs 12b on the flange ring 12 mounted into the re-entry cone 11 and that no other part of the life cell 20 is in contact therewith. Additionally, none of the structural components within the life cell 20 is in contact with the pressure shell 60.

It should further be observed that the design of the life cell 20 is such that all equipment is enclosed in the airtight chamber S and that the life cell 20 occupies approximately the bottom third of the recovery capsule 11, leaving the upper two-thirds for recovery equipment to be described below. The life cell itself is easily removable from the recovery capsule 11 by simply removing the bolts 13 and clevis nuts 14 which secure the cover or head 30 to the flange ring 12. By completely pressurizing the life cell 20, flooding of the lower end of the nose cone 11 would not affect the equipment housed in the sealed life cell as would be the case if an open-type support system were utilized.

The recovery zone T and recovery equipment contained therein are located above the life cell structure 20 and will now be described with particular reference to FIG. 1. The upper convex surface of the cover 30 is provided with an upstanding socket portion 38 for receiving a second cylindrical chamber 80 which extends from the head 30 to the interior surface of the removable cap 11b of the re-entry cone 11. The cylindrical chamber 80 surmounting the life cell 20 houses an explosive charge 81, a detonator 82 for initiating the explosive charge 81 and a piston 83 for blowing off the cap 11b in response to the explosive force. The detonator 82 may be of the barometric type which causes the charge 81 to explode when a particular altitude is reached and which is of the type well known and used in the art. For example, see U.S. Patent No. 2,501,559 to Winzen et al. for Aerial Delivery Apparatus issued Mar. 2, 1950. A shock absorbing pad 84 of rubber or the like is placed between the detonator 82 and the head 30 to absorb some of the explosive shock and to thereby preclude the same from being transmitted into the life cell 20.

Figure 1A:
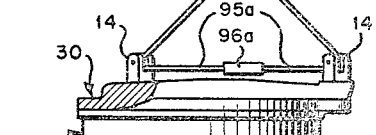
FIG. 1a is a schematic representation of the connecting arrangement between the recovery parachute and the probe.

Referring now to FIGS. 1 and 1a, a recovery parachute indicated generally at 90 surrounds the cylinder 80 within the recovery zone T of the probe 10 and includes risers, not shown, terminating in a single support riser 90a and a rip chord 90b secured to the lug 11c on cap 11. Each of these elements is known and used in the art and therefore requires no further elucidation. As indicated above, the fastening means used to connect the head 30 to the flange includes a bolt 13 extending upwardly and threadably engaging an internally threaded clevis nut 14. Clevis nut 14 in turn includes a clevis pin 14a associated therewith. In order to avoid the blanketing of any antenna and signal lights that may be included within the recovery zone T with the parachute 90 and to prevent the probe 10 from being dragged below the surface by the waterlogged parachute it may be desired to cut the parachute support riser 90a immediately prior to or shortly after impact. As may be seen in FIG. 1 and 1a this is accomplished by running a cable 95 through two of the three clevis nuts 14 which are attached to the life cell and to connect the ends thereof to the single parachute riser 90a. The horizontal leg 95a of this triangular cable arrangement is cut by a reefing cutter 96a of the type known and used in the art. The device for initiating the reefing cutter 96a before touchdown may be accomplished by the aneroid type described in Patent No. 2,501,559, mentioned above, or after touchdown by a standard commercially available sea-water actuated battery. The triangular cable and the parachute riser lie in a plane which passes through the center of gravity of the probe.

In operation, when the probe 10 re-enters the earth's atmosphere and reaches a predetermined altitude the barometric sensor and detonator 82 causes the explosion of the charge 81 which in turn, through piston 83, blows off the cap 11b. By reason of the connection between the rip chord 90b and the lug 11c on the cap 11, the parachute 90 is immediately deployed. After touchdown, or alternatively just prior thereto, the reefing cutter 96a is actuated and severs the cable 95 which permits the parachute to be separated from the probe 10.

Referring now to FIG. 3 wherein the various instruments constituting the pay load of the bio-probe 10 are shown supported on the main shelf 50, it should be understood that the various instruments are exemplary only and do not entirely illustrate the various components used in the recoverable ballistic biological space probe. The main life support functions are performed by components 100, 101, and 102 which are the pump-motor unit, air purifier-heat exchanger, and the oxygen supply, respectively. These items are schematically represented in FIG. 3, to be more fully described below. The pay load further includes components 103–105 which relate to the instrumentation for the measurement and control of the various physical variables; these include animal chamber temperature, pay load spin measurement, on board voltage measurement, oxygen flow or pressure measurement, and temperature control circuitry. Components 106–108 are representative of the instrumentation related to the biological experiments and they include such items as performance bar logic and circuitry, feeding valve circuitry, cue light and control circuits, penalty timers and circuitry, program timers and controls, and performance evaluation program circuits. Component 110 is representative of a recording device for receiving quantitized data and components 111 and 112 are representative of the transmission facilities such as modulators, RF transmitters, beacons and DF transmitters, the beacon being a radar beacon which will operate in the termination phase of flight and the DF transmitter operating after impact or touchdown. Additionally, component 113 represents the onboard power equipment for operating the various instruments and components.

Figure 4:
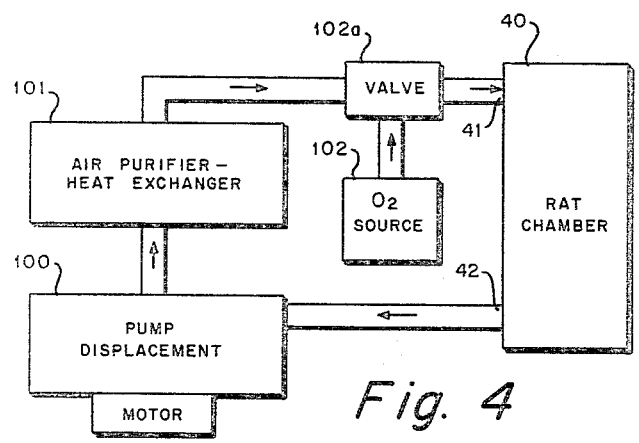
FIG. 4 is a simplified block diagram of the life support system.

FIG. 4 schematically illustrates the life supporting system of the present invention. As illustrated therein, the rat chamber 40 is provided with an inlet opening 41 for the admission of purified air and an exit opening 42 for the exit of impure air. The pump-motor unit 100 draws the impure air from the chamber 40 and supplies the same to the air purifier 101 for treatment thereof. The pump 100 is of the positive displacement type known and used in the art having very little power consumption and of sufficient operation to overcome any slight clogging that may occur in the air purifier 101. Additionally, the displacement pump 100 provides air at a lower velocity which is less disturbing to the animal R enclosed within chamber 40. The source of oxygen 102 is supplied between exit of the purifier 101 and the inlet port of chamber 40 to resupply any oxygen removed by the animal R. The manner in which the oxygen is supplied is within the skill of one having ordinary skill in the art and requires no further elaboration. Therefore, reconstituted and purified air is supplied to the inlet port 41 of the chamber 40 for use by the animal enclosed therein.

As indicated above, the rat chamber 40 and chamber S are insulated from re-entry heat by the heat shield 70 which surrounds the pressure shell 60 and is spaced therefrom thereby providing an air space therebetween for additional insulation purposes. Further, the entire cell 20 is removed from the re-entry cone 11 per se except for the connection of the cell 20 at the flange ring 12. Insulation units 37 are additionally provided at these three points. However, in view of the high internal heat generated within the life cell 20, a temperature regulating mechanism is provided which compensates for the heat generated by the animal and more particularly the heat generated by the air purification process which takes place within cell 20. The temperature regulation in the present case is accomplished by the heat exchanger which is combined with the air purification unit to provide a novel gas purifier-heat exchanger generally noted at 101, which will be more fully described below and which is integrated within the life support system.

Figure 5:
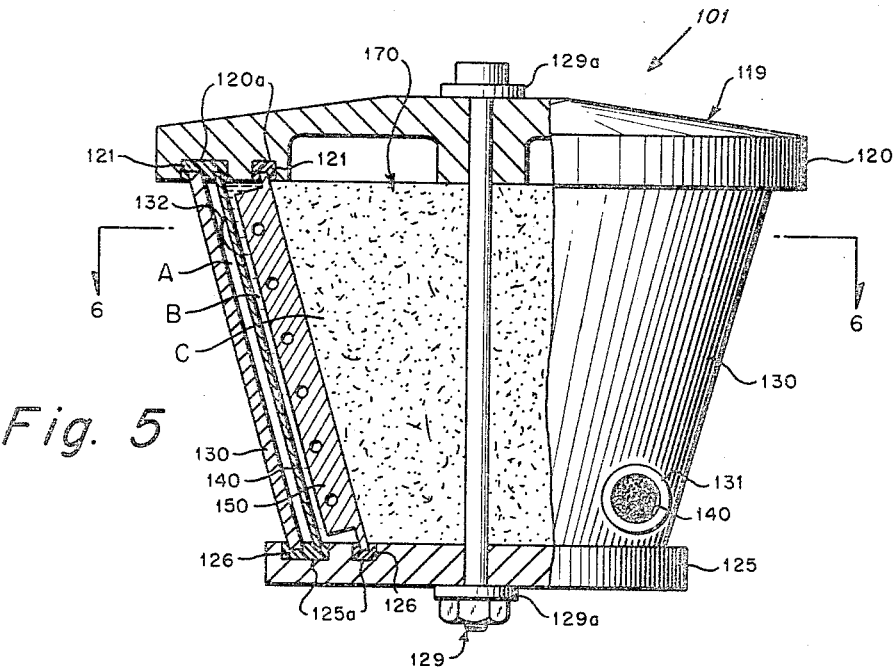
FIG. 5 is a vertical view partly in section of the novel air purifier and heat exchanger shown in FIG. 3.
Figure 6:
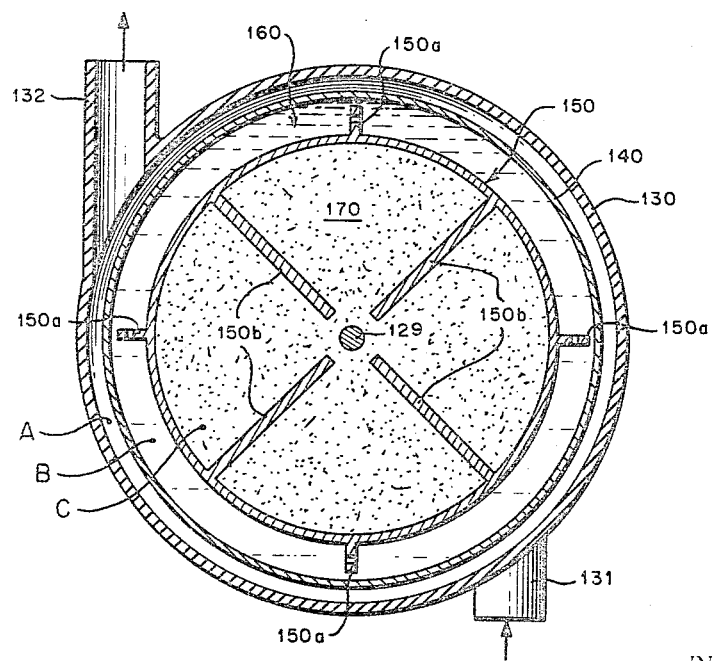
FIG. 6 is a view taken along the line 6—6 of FIG. 5.

With reference to FIGS. 5 and 6, the air purifier and heat exchanger 101 is illustrated as comprising a cannister 119 having circular top cover 120 having circumferential grooves 120a formed therein adjacent the periphery of the cover 120 filled with soft sealing material 121 of rubber or plastic material which is impervious to the effects of the chemicals to be described below. A circular base member 125 constructed of a diameter smaller than that of cover 120 is additionally formed with grooves 125a complementary to the grooves 120a formed in the top cover 120. Seals 126 are pressed into these grooves and are of material similar to that of seals 121. Coaxial apertures are formed in the top 120 and the bottom 125 for receiving a fastener 129 therethrough.

The body portion of the air purifier-heat exchanger 101 is formed by a series of three concentric shells each formed in the shape of a conical frustum now to be described. The first or outermost shell 130 is formed of nylon or the like press fitted into seals 121 and 126 and includes an entrance port 131 extending tangentially thereto at the bottom of the shell 130 and an exit port 132 also extending tangentially to the surface of the shell 130 and positioned at the upper portion of the shell 130.

An intermediate concentric shell 140 formed in the shape of a conical frustum and of a diameter smaller than that of nylon shell 130 is positioned within the nylon shell 130 and is press fitted into the seals 121 and 126. The space between elements 130 and 140 forms an air passage A for spiral movement of the air that enters the tangential inlet port 131 and exits through the tangential exit port 132. The intermediate concentric shell 140 is formed of porous stainless steel, the significance of which will be described below.

An inner concentric shell 150 of stainless steel or the like is also formed in the shape of a conical frustum having a diameter less than the diameter of the intermediate shell 140 and is positioned within the shell 140 with the marginal edges thereof press fitted into the seals 121 and 126 formed in the top and bottom covers 120 and 125, respectively. The annular space B provided between shells 140 and 150 is filled with an air purification material 160 such as lithium hydroxide (LiOH) or the like which has the capacity of absorbing carbon dioxide and water vapor. The inner shell 150 is constructed with a plurality of outwardly directed radial fins 150a which extend into the lithium-hydroxide-filled chamber B and with internally directed radial fins 150b which extend into a third chamber C confined by the concentric stainless steel shell 150. Each of the fins 150a and 150b are provided for purposes of accelerating the transfer of heat generated in chamber B by the reaction of LiOH and the contaminated air into chamber C. In order to absorb the heat generated in chamber B and to thereby prevent excessive heating of the rat chamber, chamber C is filled with a heat sink material 170 such as diphenylmethane or the like which has a high heat of fusion and a melting point in the neighborhood of the maximum temperature permitted in the rat chamber.

In operation, contaminated air is injected by pump 100 tangentially through port 131 and enters chamber A. The air takes a spiral path toward outlet 132 which insures uniform diffusion over the entire surface of the porous stainless steel wall 140. Since gas molecules are free to pass through the pores of the stainless steel cone 140, the lithium hydroxide absorbs the carbon dioxide and water vapor without the necessity of passing the air stream through the LiOH. This has the effect of reducing the resistance to flow and the power required for the pump and motor 100. Additionally, particles of LiOH dust, which cannot be tolerated by rats, are precluded from entering into the life cell by reason of the described arrangement. The heat generated by the absorption of the carbon dioxide and water by the LiOH is in turn absorbed by the diphenylmethane located within chamber C and as is readily observed, the fins 150a and 150b aid in the conduction of the heat generated within chamber B to the heat sink material 170. The amount of diphenylmethane required is that which will provide absorption of heat generated in the cannister 119 during the interval between assembly of the life cell in the vehicle and water entry after parachute descent. From this period of time forward sea water is relied upon for cooling. It should be understood that the probe 10 will be balanced before launch, and that removal of the parachute and the explosive charge, etc., will cause it to float with its axis inclined to the vertical. In view of this fact and in view of the speed at impact, the probe 10, now without the cap 11b, will ship water. This water will fill the space between the inside of the re-entry cone 11 and the outer dome 70 since there is discontinuous contact between the life cell 20 and the mounting ring 12 in the re-entry cone 11. A few small holes 200 in the outer dome 70 permits sea water to flow into the space between the outer dome 70 and the pressure cell 60 to cool the pressure cell, its flange and the clamping ring 65 which will in turn keep the life cell reasonably cool until recovery.

It should be understood that since the weight of the probe will be larger than the weight of the displaced water styrofoam flotation units may be necessary and may be appropriately placed within the probe 10 above the life cell 20. Also, since the bio-probe at some time during the launching cycle will be spin stabilized, the probe must be de-spun in order to obtain the zero-g condition necessary to insure complete freedom from body forces for the animal. De-spinning of the bio-probe may be accomplished by any of the methods well known in the art. These may include the use of de-spin nozzles mounted on the cap of the re-entry capsule or by releasing a pair of weights attached to wires which are wound around the circumference as close to the plane of the center of gravity as possible, which would reduce the angular velocity of the probe by the principal of conservation of angular momentum. It should be understood that this de-spinning also eliminates gyroscopic forces which tend to retard the orientation of the probe required for en-entry, and prevents twisting of the parachute risers during deployment.

It is, therefore, observed that a ballistic recoverable space biological probe has been provided which is capable of carrying a small animal into orbit about the earth and maintain life support for the same for a predetermined period of time during which certain data is recorded and transmitted back to earth. The structure is of light weight and of structural design sufficient to withstand the forces of re-entry into the earth's atmosphere. Additionally, the serious and complex problems involving the maintenance of the animal enclosure at a particular temperature irrespective of externally generated heat and internally generated heat has been accomplished.

It will be understood that various changes in the details, materials, steps and arrangement of parts which have been herein-described and illustrated in order to explain the nature of the invention, may be made by those skilled in the art within the principle and scope of the invention as expressed in the appended claims.

What is claimed is:

1. A recoverable ballistic space vehicle for providing life support for small animals and positionable within the nose cone of a launching vehicle comprising:
  a pressure-tight life cell including
    a structural support member,
    a first pressure shell secured to said structural support member,
    a second shell surrounding said first shell and spaced therefrom for providing heat insulation therefor, said second shell attached to said structural support member through heat insulation means,
    means secured to said structural support member and extending within said life cell for housing a small animal, and
    means within said cell and supported by said structural support member for providing life support for the small animal;
  a closed, heat-resistant re-entry capsule enclosing said life cell in spaced relationship therewith, said capsule having mounting means therein; and
  said structural support member attached to said mounting means with means therebetween for inhibiting the conduction of heat from said capsule to said life cell.

2. The device as defined in claim 1 wherein said animal housing is closed at each end and includes an inlet port and an outlet port;
  pump means associated with said outlet port for drawing gas therefrom;
  purifying means receiving the gas from said pump means for absorbing the contaminants contained therein and the heat generated thereby and providing purified gas;
  a source of oxygen;
  said inlet means receiving oxygen from said source and purified gas from said purifying means.

3. The apparatus as defined in claim 2 wherein:
  said re-entry capsule has a cap removably attached thereto;
  lug means on said cap;
  attachment means on said structural support member;
  a parachute secured to said attachment means, said parachute including a rip cord attached to said lug means;
  pressure responsive means for removing said cap from said re-entry capsule when the capsule reaches a predetermined altitude;
  whereby when said cap and associated lug are separated from said capsule, said rip cord will deploy said parachute.

4. The apparatus as defined in claim 2 wherein said purifying means includes:
  a cannister including top, bottom, and side walls, said side walls having a tangentially constructed inlet port at one end of said cannister and a similar outlet port at the other end of said cannister;
  a first closed receptacle of porous material within said cannister and spaced from said side wall thereby providing an air passage therebetween;
  a second closed receptacle within said first receptacle and spaced therefrom thereby providing a chamber therebetween, means within said chamber for absorbing the contaminants; and
  means within said second closed receptacle for absorbing the heat generated during the contaminant-absorbing process.

5. The device as defined in claim 4 wherein said first receptacle is constructed of porous stainless steel.

6. The device as defined in claim 4 further including:
  means on the second receptacle extending into said chamber and into the area circumscribed by said second receptacle for conducting the generated heat to said heat absorbing means.

7. The device as defined in claim 6 wherein said contaminant-absorbing means is lithium hydroxide and said heat-absorbing means is diphenylmethane.

8. A recoverable ballistic space vehicle for providing life support for small animals and positionable within the nose cone of a launching vehicle comprising:
  a structural support member;
  means secured to said structural support member and extending therefrom for housing the small animal;
  shelf means secured to said housing means for directly supporting the life support equipment;
  a plurality of adjustable struts connecting said shelf means to said structural support member;
  a second plurality of adjustable struts connecting said housing means to said structural support member;
  a first shell surrounding said housing, shelf means and adjustable struts, said shell connected to said structural support member and forming an airtight pressure chamber therewith;
  a second shell surrounding said first shell and spaced therefrom for providing heat insulation therefor, said second shell attached to said structural support member through insulating means;
  a closed heat resistant re-entry cone encapsulating said second shell and structural support member, said cone having a removable cap at one end thereof;
  mounting means secured to the interior surface of said cone intermediate the ends thereof; and
  said structural support member being connected to said mounting means.

9. A recoverable ballistic space vehicle for providing life support for small animals and positionable within the nose cone of a lunching vehicle comprising:
  a dish-shaped cover member;
  a hollow cylindrical enclosure having one end secured to the concave side of said cover member centrally thereof and extending normal thereto for housing the small animal;
  a load carrying lower shelf connnected to and enclosing the other end of said cylinder enclosure;
  a load carrying intermediate shelf coaxially disposed and fastened to said cylindrical enclosure;
  a plurality of turnbuckle members connected between said cover member and the periphery of said intermediate shelf;
  a second plurality of turnbuckle members connected between said cover member and said other end of said cylindrical enclosure;
  a first open ended shell surrounding said lower and intermediate shelves and turnbuckle members, the marginal edges of said shell being connected to said cover member and forming an airtight pressure chamber therewith;

a second open ended shell surrounding the exterior of said first shell and spaced therefrom for providing heat insulation therefor, the free marginal edges of said second shell being attached to said cover member through insulating means;

a closed ablative re-entry capsule encapsulating said second shell and said cover member, said capsule having a removable cap at the one end thereof facing the convex surface of said cover;

cover member mounting means secured to the interior surface of said capsule;

said cover member being connected to said mounting means; and heat insulating means interposed between said mounting means and said cover member.

10. The device as defined in claim 9 wherein:

said animal housing is closed at each end and includes an inlet port and an outlet port;

pump means associated with said outlet port for drawing gas therefrom;

purifying means receiving the gas from said pump means for absorbing the contaminants contained therein and the heat generated thereby and providing purified gas;

a source of oxygen;

said inlet means receiving oxygen from said source and purified gas from said purifying means.

11. The apparatus as defined in claim 10 wherein:

said re-entry capsule has a cap removably attached thereto;

lug means on said cap;

attachment means on the convex side of said cover member;

a parachute secured to said attachment means, said parachute including a rip cord attached to said lug means;

pressure responsive means for removing said cap from said re-entry capsule when the capsule reaches a predetermined altitude;

whereby when said cap and associated lug are separated from said capsule, said rip cord will deploy said parachute.

12. The apparatus as defined in claim 10 wherein said purifying means includes:

a cannister including top, bottom, and side walls, said side walls having a tangentially constructed inlet port at one end of said cannister and a similar outlet port at the other end of said cannister;

a first closed receptacle of porous stainless steel material within said cannister and spaced from said side wall thereby providing an air passage therebetween;

a second closed receptacle within said first receptacle and spaced therefrom thereby providing a chamber therebetween, means within said chamber for absorbing the contaminants; and means within said second closed receptacle for absorbing the heat generated during the contaminant-absorbing process.

13. The device as defined in claim 12 further including:

means on the second receptacle extending into said chamber and into the area circumscribed by said second receptacle for conducting the generated heat to said heat absorbing means.

14. The device as defined in claim 13 wherein said contaminant-absorbing means is lithium hydroxide and said heat-absorbing means is diphenylmethane.

15. A combination air purifier and heat exchanger comprising:

a cannister including top, bottom, and side walls, said side walls having a tangentially constructed inlet port at one end of said cannister and a similar outlet port at the other end of said cannister;

a first closed receptacle of porous stainles steel material within said cannister and spaced from said side walls thereby providing an air passage therebetween;

a second closed receptacle within said first receptacle and spaced therefrom thereby providing a chamber therebetween, means within said chamber for absorbing the contaminants; and means within said second closed receptacle for absorbing the heat generated during the contaminant-absorbing process.

16. The air purifier-heat exchanger as defined in claim 15 and including:

means on the second receptacle extending into said chamber and into the area circumscribed by said second receptacle for conducting the generated heat to said heat absorbing means; and wherein said contaminant-absorbing means is lithium hydroxide and said heat-absorbing means is diphenylmethane.

References Cited by the Examiner

UNITED STATES PATENTS

| 2,909,415 | 10/1959 | Houdry | 23—288 |
| 2,956,865 | 10/1960 | Williams | 23—284 |
| 3,093,346 | 6/1963 | Faget et al. | 244—1 |
| 3,188,961 | 6/1965 | Scruggs et al. | 102—92.5 |

References Cited by the Applicant

UNITED STATES PATENTS

| 3,053,476 | 9/1962 | Mohar. |

FERGUS S. MIDDLETON, *Primary Examiner.*